United States Patent [19]

Hoyt et al.

[11] 4,003,810

[45] Jan. 18, 1977

[54] PREVENTING DISCOLORATION IN HYDROLYZED ETHYLENE-VINYL ACETATE COPOLYMERS

[75] Inventors: John M. Hoyt; Karl Koch; Mathew Williams, Jr., all of Cincinnati, Ohio

[73] Assignee: National Distillers and Chemical Corporation, New York, N.Y.

[22] Filed: May 6, 1976

[21] Appl. No.: 683,991

Related U.S. Application Data

[60] Continuation of Ser. No. 516,247, Oct. 18, 1974, abandoned, which is a division of Ser. No. 377,997, July 10, 1973, Pat. No. 3,882,005.

[52] U.S. Cl. ............................ 204/159.14; 526/8; 526/10
[51] Int. Cl.² ........................................ C08F 8/12
[58] Field of Search ............ 526/8, 10; 204/159.14

[56] References Cited

UNITED STATES PATENTS

| 3,344,129 | 9/1967  | Bestian et al. | 260/87.3 |
| 3,386,978 | 6/1968  | Salyer         | 260/87.3 |
| 3,483,171 | 12/1969 | Kuhlkamp et al.| 260/80.6 |
| 3,513,142 | 5/1970  | Blumberg et al.| 260/85.7 |
| 3,523,933 | 8/1970  | Inskp          | 260/89.1 |
| 3,547,858 | 12/1970 | Worrall        | 260/87.3 |
| 3,780,004 | 12/1973 | Hoyt et al.    | 260/87.3 |

*Primary Examiner*—Stanford M. Levin
*Attorney, Agent, or Firm*—Kenneth D. Tremain

[57] ABSTRACT

A process for the hydrolysis of a solid interpolymer of an ethylenically unsaturated hydrocarbon and a vinyl ester of a 2-6 carbon atom aliphatic carboxylic acid to products having a low yellowness index involves contacting of the solid interpolymer with a substantially anhydrous hydrolyzing agent and subjecting at least one of said interpolymer and said hydrolyzing agent to radiation.

2 Claims, No Drawings

PREVENTING DISCOLORATION IN HYDROLYZED ETHYLENE-VINYL ACETATE COPOLYMERS

This is a continuation, of application Ser. No. 516,247, filed Oct. 18, 1974 now abandoned, which is a division of application Ser. No. 377,997 filed July 10, 1973, now U.S. Pat. No. 3,882,005, issued May 6, 1975.

BACKGROUND OF THE INVENTION

Hydrolysis of interpolymers of ethylene and an organic monocarboxylic acid ester of vinyl alcohol is described in U.S. Pat. No. 2,386,347. The interpolymer is dissolved in an alkaline liquid medium in which it is hydrolyzed.

Solid phase hydrolysis of a copolymer of an olefinic hydrocarbon and an ester of unsaturated alcohol is disclosed in British Pat. No. 1,095,204 and U.S. Pat. No. 3,510,463. In this process, the solid copolymer is heated with a hydrolyzing agent, preferably a lower alkyl alcohol containing an alkaline reacting catalyst such as an alkali metal alkoxide until alcoholysis is achieved. The solid copolymer does not dissolve but is transformed into the hydrolyzed or alcoholized product. This process is attractive because of its simplicity, but, unfortunately, has one very undesirable feature. The product obtained, especially at high degrees of hydrolysis, is discolored yellow, orange, or golden brown. This color is not readily removed by washing or extracting with alcohols or other solvents. It is undesirable that the hydrolyzed resin product be discolored because the articles molded therefrom will also be discolored to a similar extent.

The hydrolysis process is accomplished by an alcoholysis or transesterification reaction in which, for example, an ethylene-vinyl acetate copolymer is converted to the hydrolyzed product and the acetate ester of the alcohol used, e.g. methyl acetate from methyl alcohol. In virtually all cases, the hydrolyzed product is, in fact, a terpolymer composed of repeating units of ethylene, vinyl alcohol, and a small amount of unhydrolyzed vinyl acetate. The problem of yellow to orange to brown discoloration in the hydrolyzed product becomes a serious when the degree of hydrolysis is relatively high, for example, when, in the case of ethylene-vinyl acetate copolymers containing 3-50 weight percent vinyl acetate, the hydrolyzed product contains 0.1-15 weight percent residual vinyl acetate. Usually the color retention is most severe in hydrolyzed products containing 0.1-5% residual vinyl acetate.

The degree of discoloration produced in the solid phase alcoholysis of ethylene-vinyl ester copolymers also becomes more serious as the amount of catalyst used to effect the reaction is increased, or as the volume of the alcoholysis medium is decreased. Generally, for a given alcoholic medium, the lower the vinyl ester content of the copolymer, the greater will be the amount of catalyst required to effect the hydrolysis in a given period of time. Consequently, the lower the vinyl ester content of the ethylene-vinyl ester copolymer hydrolyzed, the greater will be the amount of discoloration in the product.

We have now found that exposure of the material hydrolyzed and/or the hydrolyzing agent to irradiation acts to prevent the development of color. However, it is not apparent why the irradiation suppresses the color build-up in the hydrolyzed resin product. We have found that the hydrolysis medium always becomes discolored yellow to brown as the alcoholysis proceeds whether or not radiation is employed. Evidently, the irradiation does not operate by destroying all color in the medium. Possibly the objectionable color bodies are destroyed selectively or they are modified in some way such that they are not readily absorbed onto the hydrolyzed resinous product.

It is the object of this invention to provide a process for the production of hydrolyzed olefin-vinyl ester interpolymers which are colorless, i.e., having a yellowness index of less than 30. This and other objects of the invention will become apparent to those of ordinary skill in the art from the following detailed description.

SUMMARY OF THE INVENTION

This invention relates to hydrolyzed olefin-vinyl ester interpolymers and more particularly to a process for the production of olefin-vinyl ester interpolymers which have a yellowness index of less than 30 by employing irradiation, and to the product thus produced.

DESCRIPTION OF THE PREFERRED EMBODIMENTS

In accordance with this invention, an interpolymer of an ethylenically unsaturated hydrocarbon and a vinyl ester of a 2–6 carbon atom aliphatic carboxylic acid is hydrolyzed by means of a substantially anhydrous hydrolyzing agent and the interpolymer and/or the hydrolyzing agent is subjected to irradiation.

The ethylenically unsaturated hydrocarbon is generally an alpha-olefin of 2–10 carbon atoms, preferably 2–4 carbon atoms, such as ethylene, propylene, butene, hexene, 2,2,4-trimethyl-pentene-1, and the like. Typical vinyl esters include vinyl formate, vinyl acetate, vinyl trimethyl acetate, vinyl propionate, vinyl butyrate, vinyl trifluoroacetate, and the like. The interpolymers may also contain minor amounts of up to about 5 weight percent of another monomer which can be another of the aforementioned vinyl esters or carbon monoxide, methyl acrylate, n-butyl acrylate, di-n-butyl maleate, diethyl itaconate, and the like.

The preferred interpolymer employed in this invention is an ethylene-vinyl ester copolymer and most preferably an ethylene-vinyl acetate copolymer. The copolymers which can conveniently be hydrolyzed by the process of this invention contain from about 1 to about 25 mole percent of the vinyl ester or from about 3 to about 50 weight percent when the vinyl ester is vinyl acetate. Most preferably, the copolymers contain about 3–38 mole percent vinyl ester, or about 8–40 weight percent when the vinyl ester is vinyl acetate. The vinyl ester content of the interpolymer can be determined by saponification. The preferred ethylene-vinyl ester copolymers have melt flow rates as determined by ASTM 1238-65T which broadly vary from about 0.15 g/10 min, as determined by Condition E to about 25 g/10 min as determined by Condition A. The melt flow rate under Condition E will hereinafter be termed "melt index." The copolymers generally have a melt index in the range of about 1 to 25.

The interpolymers subjected to hydrolysis in the present process are in solid form. The size and shape of the discrete solid particles can vary widely, e.g., the copolymers may be pulverulent or granular in form. Especially preferred are the ultra-fine powders described in U.S. Pat. No. 3,422,049 which are spherical particles having dimensions in the range of 0.1 to 100 microns.

The interpolymers can conveniently be hydrolyzed in the pellet form in which such resins are commonly commercially supplied. Generally, such pellets are cubical to ovoid in shape and their largest dimension can range from about 0.5 to as much as 10 mm, although 2–5 mm pellets are preferred.

The interpolymers can also be in the form of fibers or strands, the diameters of which can range from 0.01 mm to 10 mm and are preferably about 0.1 to 5 mm. Films and sheets of the interpolymers can also be hydrolyzed. The thickness of such films and sheets can be as low as 0.1 mil and as high as 0.5 inch although a range of 1 mil to 0.25 inch is preferred.

The alcoholic medium required for the hydrolysis reaction is, generally, any primary or secondary alcohol containing up to about 10 carbon atoms. Lower alkyl (1–4 carbon atom) alcohols, such as methyl alcohol, ethyl alcohol, n-propyl alcohol, and isopropyl alcohol, are preferred.

If desired, a second organic solvent can be used in conjunction with the alcoholic medium in order to promote the reaction by causing swelling or softening of the interpolymer resin. The swelling agents can be a linear or branched, saturated, acyclic hydrocarbon, or a cyclic, saturated hydrocarbon, containing up to about 10 carbon atoms such as hexane, heptane, octane, decane, diisobutane, cyclohexane, and the like, or an aromatic hydrocarbon containing up to about 12 carbon atoms such as benzene, toluene, xylene, cumene, pseudocumene, cymene, diisopropylbenzene, and the like.

In all cases, the alcohols and swelling agents must be substantially anhydrous in order that the maximum rates of alcoholysis be achieved. By substantially anhydrous is meant a water content of less than about 1%. Preferably, the water content is less than 0.1%.

Additionally, in order to obtain excellent run to run reproducibility, the water content of the reaction medium should be maintained substantially constant, i.e., not varying by more than about 50% and preferably not more than about 20% as more fully set forth in our co-pending application Ser. No. 286,788, filed Sept. 6, 1972. Thus, if the first run water content is 0.1%, the water content in subsequent runs should be in the range of 0.05–0.15%, preferably 0.08–1.2%. The substantially constant water content can be maintained by controlling the amount of water in the alcoholic medium and, if used, the second organic solvent at low, uniform levels as they are supplied and operating under a dry, preferably an inert, gaseous blanket, for example, the liquid feed streams can be dried before use by passage through a suitable solid desiccant such as activated molecular sieves, activated alumina or silica gels. The drying is conducted under anhydrous conditions, i.e., under a protective atmosphere of a dry inert gas such as dry nitrogen, argon or helium having a water content below about 1000 ppm, preferably below about 300 ppm.

The weight ratio of the alcoholysis medium to interpolymer can vary from as little as 0.1:1 to as high as 20:1; ratios of 1:1 to 3:1 are preferred. The amount of alcohol present, however, must be at least stoichiometric for the amount of alcoholysis which it is desired to accomplish. Preferably, the amount of alcohol will range from about 2 to about 100 times the stoichiometric amount of alcohol required.

When a softening solvent is used in combination with the alcohol, the amount of the adjunct used will depend on the nature of the alcohol, the composition and molecular weight of the interpolymer, and the nature of the softening solvent. Broadly, the alcoholysis medium can contain about 1 to 80 weight percent of the softening solvent, preferably 20–40 weight percent, based on the total weight of the medium. As one example, if the interpolymer is an ethylene-vinyl acetate copolymer containing about 25–30 weight percent vinyl acetate and having a melt index of 1–25, and the alcohol used in methanol, the alcoholysis medium can contain up to 50 weight percent toluene as the softening solvent.

A catalyst is preferably used in the hydrolysis reaction. The preferred catalyst is an alkali metal alkoxide such as sodium methoxide, lithium methoxide, and the like, and in general can be any of the sodium, potassium or lithium alkoxides derived from any of the alcohols used as the alcoholysis medium. Alkali metal hydroxides such as sodium hydroxide, potassium hydroxide and lithium hydroxide, can also be employed as catalysts. The amount of catalyst can vary broadly from about 0.1 to about 100 weight percent based on the weight of the interpolymer and is preferably about 1 to 10 weight percent. High catalyst/interpolymer weight ratios are sometimes needed when high rates of hydrolysis are desired or when relatively low amounts of the vinyl ester are contained in the resin subjected to hydrolysis.

The hydrolysis reaction temperature can vary from about 0° to 250° C. with temperatures of 30° to 100° C. being preferred. Any pressure from atmospheric to about 5000 psi can be employed so long as it is sufficient to maintain the alcoholysis medium in the liquid phase. Reaction times can range from as short as about 1 second to about 24 hours; preferred times are from 1 minute to 10 hours.

The irradiation employed in the present invention is electromagnetic radiation of wave lengths in the range of about 3000–8000 angstrom units. The radiation can be provided by mercury lamps or fluorescent lamps commercially available for producing near-ultraviolet or "black" light. The mercury lamps are preferred and generally produce light of numerous wave lengths in the range of 3000–7600 angstrom units; the principal or strongest wave lengths emitted, however, are at 3654 angstrom units in the near-ultraviolet and 4358, 5461 and 5780 angstrom units in the visible range. No filter is used with the mercury lamp and the alcoholysis medium or reaction product is exposed to all wave lengths emitted by the lamp.

The amount of electrical energy supplied to the mercury lamp to effect the desired suppression of color can vary from about 0.01 to about 100 kilowatt hours/liter of alcoholysis medium and is preferably about 0.5 to 10 kilowatt hours per liter.

In the preferred embodiment of the invention, the irradiation is applied to the liquid alcoholysis medium at a point remote from the hydrolysis reactor. This can be accomplished, for example, by circulating the medium from the alcoholysis reactor by means of a pump, through an irradiation chamber, and then back to the alcoholysis reactor. The irradiation can also be applied to the medium and interpolymer reaction mixture during the hydrolysis reaction. It is also possible to effect color removal by a post-alcoholysis irradiation of the hydrolyzed product but such a procedure is not preferred because additional time will be needed for the irradiation procedure and this is not economically desirable.

The amount of irradiation applied is not narrowly critical and it is most convenient to continuously irradiate during the entire hydrolysis reaction. Minimum exposure time depends on numerous factors including the nature of the particular interpolymer hydrolyzed, the nature of the alcoholysis medium and, if used, softening solvent, reaction time, reaction pressure, reaction temperature, and the catalyst employed. Determination of the minimum exposure time can be readily determined by those skilled in the art.

The yellowness indices of the hydrolyzed resin products of this invention are calculated according to ASTM D-1925-63T from CIE-1931 System tristimulus values determined in accordance with ASTM Method D-2244-64T with an Automatic Color-Brightness Tester made by Martin Sweets, Inc. of Louisville, Kentucky. The tristimulus values were determined on 0.25 inch thick placques of hydrolyzed resin products compression molded at 150° C. within 1–3 days after completion of the alcoholysis reaction. The colormetric measurements themselves were completed in a period of 1–5 days after the completion of the alcoholysis reactions. The hydrolyzed resin products and molded placques therefrom were protected from light before the tristimulus measurements by keeping them completely wrapped in aluminum foil.

The following Examples are set forth in order to further illustrate the invention. Unless otherwise specified, all parts and percentages are by weight and all temperatures are in degrees centigrade throughout this specification and claims.

EXAMPLE 1

Control Reaction A

A 1-liter, 3-necked Pyrex glass reaction flask was equipped with a mechanically-driven paddle stirrer, reflux condenser, oil heating-bath and nitrogen-inlet. The system was initially flushed with nitrogen, and then a nitrogen atmosphere was established in the flask at a small positive pressure (~2–3 mm Nujol mineral oil) and maintained throughout the operations described hereinafter.

Into the flask was introduced 180 ml of methanol followed by 5.20 g (0.226 g-atom) of freshly cut metallic sodium. After the sodium had completely dissolved, there was rapidly added to the resulting sodium methoxide solution 125.0 g of pellets of an ethylene/vinyl acetate copolymer having a melt index of 3.3 g/10 min. and a vinyl acetate content of 27.7%. Sieve analysis of the pellets showed that all pellets had passed a No. 5 sieve (nominal opening 4.00 mm) and all retained by a No. 10 sieve (nominal opening 2.00 mm) of the U.S. Standard Sieve Series described by ASTM E11-61. The pellet suspension was then heated to reflux with stirring and the refluxing and stirring was continued for about 5 hours to effect the desired alcoholysis reaction. Under these conditions the pellets do not dissolve or coalesce, but gradually acquire an objectionable yellow-orange color as they are hydrolyzed.

At the end of the 5 hour alcoholysis period, the suspension was cooled below the reflux temperature and the brown liquid layer was decanted from the hydrolyzed pellets. It was immediately replaced with about an equal volume of 90% aqueous methanol, which was then refluxed with stirring for 15 minutes. The reflux washing procedure was repeated 4 more times, whereupon the pellets (110.1 g) were dried overnight in a vacuum oven (water aspirator) at about 65° C. Despite the exhaustive washing procedure, the dried pellets were still dark yellow, the color being uniformly distributed from pellet to pellet. Yellowness index and other properties of this hydrolyzed resin appear in Table I.

This control reaction (no applied irradiation) was carried out in a sume hood illuminated with a 200 watt, glass-encased incandescent light bulb located about 3 feet overhead. The fume hood was located in a laboratory which was illuminated with General Electric "Cool White" fluorescent lamps (No. F96-T-12). The laboratory had two glass windows on the north side.

EXAMPLE 2

Reaction A

The procedure of Example 1 was repeated exactly but a mercury lamp was placed 3 inches from the Pyrex reaction flask at a position about 30° above the horizontal. The radiation was continuously applied throughout the 5-hour hydrolysis period and also during the reflux-washing with 90% aqueous methanol. After drying, a total of 109.5 g of pellets of hydrolyzed resin was obtained. The pellets were almost colorless. Yellowness index and other properties of this product are shown in Table I.

The background illumination in this reaction was essentially identical to the control experiment described in Example 1. The radiation source used was a Blak-Ray lamp, model B-100A, supplied by Ultraviolet Products, Incorporated of San Gabriel, California. The filter furnished with this lamp to provide "black light" was removed and was not used in any of the irradiation described in this or the succeeding Examples. The bulb used was a 100-watt General Electric mercury lamp (Par 38 Spot Bulb, Code II 100 PS44-4). According to the manufacturer, this bulb emits wave lengths between 3000 and 7600 Angstrom Units. Principal wave lengths emitted are 3654, 4358, 5461 and Angstrom units.

EXAMPLE 3

Control Reaction B

Into the reactor described in Example 1 was introduced, under nitrogen, 160 ml of methanol followed by 2.00 g (0.087 g-atom) of freshly cut metallic sodium. When the sodium had dissolved, the temperature of the resulting solution of sodium methoxide in methanol was adjusted to about 30° C., whereupon there was rapidly added 100.0 g of pellets of an ethylene/vinyl acetate copolymer containing 39.1% vinyl acetate and having a melt index of 5 g/10 min. Sieve analysis showed that all pellets passed a No. 5 sieve and all were retained by a No. 10 sieve. The suspension of pellets was heated to reflux with stirring over a period of 30 minutes and was thereafter stirred and refluxed for a period of 4 hours. The suspension exhibited yellow color after about 45 minutes.

After this period, the brown reaction liquid was decanted and replaced with 200 ml of 90% aqueous methanol and refluxed with stirring for 15 minutes to promote removal of sodium salts and yellow color from the pellets. The wash solution was decanted and the washing procedure was repeated 4 additional times. After drying overnight in vacuum at 65° C., there was obtained as a product, 81.3 of g of uniformly yellow pellets. The properties of this resin appear in Table I.

EXAMPLE 4

Reaction B

The procedure of the control reaction B described in Example 3 was repeated except that the radiation was applied throughout both the 4.5 hour hydrolysis period and washing period by means of the mercury lamp described in Example 2. The product of hydrolysis under irradiation was 81.6 g of hazy white pellets. No yellow color could be detected visually. Properties of this resin are shown in Table I.

EXAMPLE 5

Control Reaction C

Into the reactor described in Example 1 was introduced, under nitrogen, 160 ml of methanol followed by 11.6 g (0.290 mol) of U.S.P. sodium hydroxide pellets. When the sodium hydroxide had dissolved in the methanol, there was added at once 110.0 g of an ethylene/vinyl acetate copolymer in the form of a powder. The ethylene/vinyl acetate copolymer contained about 19% vinyl acetate and had a melt index of 20 g/10 min. The copolymer had previously been converted to a fine powder by the process of U.S. Pat. No. 3,422,049, whereby a powder was produced which was substantially all comprised of spherical particles having an average particle size of 10–30 microns.

The hydrolysis reaction was continued for 4 hours at reflux whereupon a dark yellow slurry was produced. The hydrolyzed powder was collected by filtration on a Buchner funnel and washed 5 times with 200 ml portions of methanol to afford, after drying, 99.8 g of light yellow powder. Properties of this hydrolyzed powder are summarized in Table I. Microscopic examination of the hydrolyzed powder showed no agglomeration or substantial change in particle shape had occurred.

EXAMPLE 6

Reaction C

The procedure of Example 5 was repeated but the hydrolysis step was carried out in the presence of applied irradiation as described in Example 2. The product obtained was a white powder, 103.3 g, described in detail in Table I.

EXAMPLE 7

Control Reaction D

A 1-liter, 3-necked Pyrex glass reaction flask having a bottom opening through a 9 mm stopcock was fitted with a reflux condenser, mechanically driven paddle stirrer and nitrogen inlet, and was heated with a suitable heating mantle. Connection was made from the bottom draw-off of the reaction flask to a Pyrex glass coil (8 feet of 10 mm tubing in 12 turns) and thence to a circulating pump and back to the reaction flask. Glass tubing and natural rubber tubing were employed to make the connections. The circulating pump was of the oscillating type and was supplied by Cole-Parmer Instrument Co. (Model 7103-1). It delivered about 1.3 l/min. of methanol in the described set-up. The glass coil was suspended inside a mirrored Dewar flask (5 inch diameter, 7 inch depth) in such a way that the mercury lamp described in Example 2 could be fitted just over the Dewar flask mouth, and about 4–5 inches above the glass coil. In this way it was possible to pump the hot methanolic sodium methoxide solution from the reaction flask through the coil suspended in the Dewar flask where irradiation took place and then back to the reaction flask. The mercury lamp and Dewar flask irradiation chamber were covered by aluminum foil so that no applied radiation could reach the resin pellets being hydrolyzed in the reaction flask. Radiation, however, could be applied to the circulating hot methanolic-sodium methoxide alcoholysis medium in the glass coil so that destruction of color-producing bodies could be accomplished therein, at a point remote from the pellets being hydrolyzed in the reaction flask.

400 ml of methanol was introduced into the reaction flask of the above described apparatus under nitrogen, followed by 5.00 g (0.217 g-atom) of freshly cut metallic sodium. When the sodium had completely dissolved, there was added to the resulting methanolic sodium methoxide solution 100 g of pellets of an ethylene/vinyl acetate copolymer of melt index 5 g/10 min, and containing 39.1% vinyl acetate. The suspension of pellets was refluxed with stirring in the reaction flask for a period of 5 hours while the methanolic sodium methoxide alcoholysis medium was circulated steadily through the glass coil by means of the circulating pump. No irradiation was applied to the glass coil. The pellets of hydrolyzed copolymer was recovered by decanting the brown liquid reaction medium, washing 3 times in refluxing 90% aqueous methanol for 15 minutes, and drying. The recovered hydrolyzed pellets were light yellow and amounted to 81.8 g. They are described more fully in Table II.

EXAMPLE 8

Reaction D

The procedure of Example 7 was repeated, but irradiation from the mercury lamp was applied to the methanolic sodium methoxide alcoholysis medium as it passed through the glass coil in the manner indicated in Example 7. The irradiation was continued throughout the 5-hour hydrolysis period and the subsequent washing period as well. The hydrolyzed pellets amounted to 81.5 g and were nearly colorless. Their properties are described in Table II.

EXAMPLE 9

Reaction D¹

The procedure of Example 8 was repeated and except that 125 g of an ethylene/vinyl acetate copolymer of melt index 3.2 and containing 27.7% vinyl acetate was alcoholyzed in 400 ml of methanol in which 11.5 g (0.50 g-atom) of metallic sodium had been dissolved. The hydrolyzed resin pellets were washed by stirring for 5 minutes each with three successive fresh portions (200 ml) of continuously circulating methanol. Radiation was applied to the glass coil, as described in Example 8, throughout the reaction and washing operations. After drying there was obtained 109 g of nearly colorless pellets, described further in Table II.

EXAMPLE 10

Reaction E

This Example illustrates the use of radiation having wave lengths of 3000–8000 Anstron units to remove color from already hydrolyzed resin.

A 100 g sample of an ethylene/vinyl acetate copolymer (20% vinyl acetate) in fine powder form (prepared by method of U.S. Pat. No. 3,422,049) was subjected to alcoholysis for 5 hours at reflux in 220 ml of dry methanol in which 4.6 g of metallic sodium had previously been dissolved. The dry, hydrolyzed, pulverulent resin was spread our in a 1/16 inch layer and irradiated for 2 hours with unfiltered radiation from the mercury lamp described in Example 2, whereupon the powder became substantially white or colorless.

ment and those at the center of the beam became colorless; pellets at the periphery retained some yellow color.

TABLE I

ALCOHOLYSIS OF SOLID ETHYLENE/VINYL ACETATE COPOLYMERS IRRADIATION FROM MERCURY LAMP APPLIED DIRECTLY TO REACTING MIXTURE

| Reaction | Ethylene/Vinyl Acetate Copolymer | | | | Mercury Lamp Irradiation Used | Hydrolyzed Product | | | | |
|---|---|---|---|---|---|---|---|---|---|---|
| | Vinyl Acetate Content, % | Melt Index, g/10min | Physical Form | Wgt. Used, g. | | Weight Recovered, g. | Color | Yellowness Index | Residual Vinyl/ Acetate % | Melt Index, g/10 min. |
| Control A | 27.7 | 3.3 | pellets | 125 | no | 110.1 | dark yellow | 93.9 | 1.5 | 2.0 |
| A | 27.7 | 3.3 | pellets | 125 | yes | 109.5 | colorless | 17.1 | 1.5 | 1.2 |
| Control B | 39.1 | 5 | pellets | 125 | no | 81.3 | yellow | 46.41 | 1.5 | 2.7 |
| B | 39.1 | 5 | pellets | 125 | yes | 81.6 | colorless | 25.85 | 1.5 | 2.5 |
| Control C | 19 | 20 | powder | 110 | no | 99.8 | yellow | 115.67 | 0.6 | 15.0 |
| C | 19 | 20 | powder | 110 | yes | 103.3 | white | 14.95 | 1.0 | 13.4 |

TABLE II

ALCOHOLYSIS OF SOLID ETHYLENE/VINYL ACETATE COPOLYMERS IRRADIATION FROM MERCURY LAMP APPLIED TO CIRCULATION LIQUID ALCOHOLYSIS MEDIUM AT A POINT REMOTE FROM REACTION

| Reaction | Ethylene/Vinyl Acetate Copolymer | | | | Mercury Lamp Irradiation Used | Hydrolyzed Product | | | | |
|---|---|---|---|---|---|---|---|---|---|---|
| | Vinyl Acetate Content, % | Melt Index, g/10min | Physical Form | Wgt. Used, g. | | Weight Recovered, g. | Color | Yellowness Index | Residual Vinyl/ Acetate % | Melt Index, g/10 min. |
| Control D | 39.1 | 5 | pellets | 125 | no | 81.8 | light yellow | 34.96 | 0.83 | 2.6 |
| D | 39.1 | 5 | pellets | 125 | yes | 81.5 | very pale yellow | 18.1 | 0.85 | 2.4 |
| D¹ | 27.7 | 3.3 | pellets | 125 | yes | 109 | very pale Yellow | 20.9 | 1.13 | 3.4 |

EXAMPLE 11

Reaction F

This Example illustrates the use of radiation having wave lengths of 3000–8000 Angstrom units to remove color from already hydrolyzed resin.

An ethylene/vinyl acetate copolymer which contained about 43.5% vinyl acetate and comprising ovoid pellets having a largest dimension of about ⅛ to 7/32 inch was hydrolyzed in methanolic sodium methoxide solution. After prolonged washing with methanol containing methyl acetate produced by the alcoholysis, the pellet product was dried and found to contain about 0.75% residual vinyl acetate and to have a melt index of 7. Despite the washing the pellets had received, they were brown in color. Accordingly, 18.3 g of the brown pellets were spread in single-pellet layer on the frit of a jacketed Buchner funnel. The mercury lamp described in Example 2 was placed over the mouth of the funnel (distance 4 inches). With water passing through the jacket of the Buchner funnel and an air stream passing upward through the funnel frit, irradiation was applied for 4 hours. The pellets remained cold during this treat- Various changes and modifications can be made in the process and products of the present invention without departing from the spirit and the scope thereof. The various embodiments described herein were presented to further illustrate the invention but were not intended to limit it.

We claim:
1. A hydrolyzed ethylene-vinyl acetate copolymer having a residual vinyl acetate content of 0.1 to 15 weight percent, said hydrolyzed ethylene-vinyl acetate copolymer having a yellowness index (ASTM D-1925-63T) of a specimen thickness of 0.25 inch and having been prepared by
    alcoholyzing an ethylene-vinyl acetate copolymer containing 8–40 weight percent vinyl acetate and having a melt index in the range of from 1 to 25 in suspension in a substantially anhydrous alcoholyzing medium containing a lower alkanol having from 1 to 4 carbon atoms and an alkali metal alkoxide or hydroxide catalyst, and
    subjecting the alcoholyzing reaction medium containing the copolymer to electromagnetic radiation of wave lengths in the range of about 3,000 to 8,000 Angstrom units during at least a portion of the alcoholysis reaction.
2. The hydrolyzed ethylene-vinyl acetate copolyme of claim 1, having a residual vinyl acetate content o 0.1 to 5 weight percent.

* * * * *

UNITED STATES PATENT OFFICE
CERTIFICATE OF CORRECTION

PATENT NO. : 4,003,810
DATED : January 18, 1977
INVENTOR(S) : John M. Hoyt, et al.

It is certified that error appears in the above-identified patent and that said Letters Patent are hereby corrected as shown below:

Col. 2, line 51, "3-38" should read as -- 3-18 --

Col. 6, line 40, after the word "and" insert -- 5780 --

Col. 7, line 21, after the word "a" insert -- fine --

Col. 10, line 51, after the word "of", first occurrence, insert -- less than 30 for --

Signed and Sealed this

Twenty-eighth Day of June 1977

[SEAL]

Attest:

RUTH C. MASON
*Attesting Officer*

C. MARSHALL DANN
*Commissioner of Patents and Trademarks*